United States Patent [19]

Kiyooka

[11] 4,403,371
[45] Sep. 13, 1983

[54] DEBRIS COLLECTING DEVICE

[75] Inventor: Katsumi Kiyooka, Warabishi, Japan

[73] Assignee: Komatsu Zenoah Co., Tokyo, Japan

[21] Appl. No.: 258,513

[22] Filed: Apr. 28, 1981

[30] Foreign Application Priority Data

| May 7, 1980 | [JP] | Japan | 55-059282 |
| May 7, 1980 | [JP] | Japan | 55-059481 |
| May 7, 1980 | [JP] | Japan | 55-061450[U] |
| May 7, 1980 | [JP] | Japan | 55-061451[U] |
| May 7, 1980 | [JP] | Japan | 55-061452[U] |
| May 7, 1980 | [JP] | Japan | 55-061453[U] |
| Jun. 13, 1980 | [JP] | Japan | 55-079109 |
| Jun. 13, 1980 | [JP] | Japan | 55-081650[U] |
| Jun. 13, 1980 | [JP] | Japan | 55-081651[U] |
| Jun. 30, 1980 | [JP] | Japan | 55-090643[U] |
| Aug. 9, 1980 | [JP] | Japan | 55-079110 |
| Aug. 9, 1980 | [JP] | Japan | 55-108822[U] |

[51] Int. Cl.³ .............................................. A47L 5/18
[52] U.S. Cl. ...................................... 15/328; 15/401; 15/409
[58] Field of Search .............................. 409/401, 328

[56] References Cited

U.S. PATENT DOCUMENTS

| 751,786 | 2/1904 | Elston | 15/409 |
| 2,026,291 | 12/1935 | Tirimacco | 15/409 X |
| 3,704,482 | 12/1972 | Brannon | 15/409 X |
| 3,808,631 | 5/1974 | Shibata et al. | 15/409 X |
| 3,922,753 | 12/1975 | Aberilla | 15/409 |
| 4,290,165 | 9/1981 | Hiramatsu | 15/409 |

FOREIGN PATENT DOCUMENTS 517203 2/1931 Fed. Rep. of Germany ........ 15/409

Primary Examiner—Chirs K. Moore
Attorney, Agent, or Firm—Beehler, Pavitt, Siegemund, Jagger & Martella

[57] ABSTRACT

Improvements in air blower driven debris collecting devices are disclosed including interchangeable air driven dispenser attachments for dispensing liquids and powders dispersed in an air stream; a debris collector including a portable air blower, a hand held debris pickup nozzle, and a free standing debris collecting container; and an improved housing construction for a portable blower wherein the air intake and engine exhaust ports are positioned so as not to interfere with the operator carrying the blower and having an integral air cleaner filter holder for the engine carburator.

1 Claim, 8 Drawing Figures

DEBRIS COLLECTING DEVICE

BACKGROUND OF THE INVENTION

The present invention relates to a debris collecting device for collecting debris such as fallen leaves and the like on the ground surface.

STATE OF THE PRIOR ART

Prior art dust collecting devices of this type are constructed in such a manner that in response to the suction generated by an air suction machine the debris such as fallen leaves on the ground surface are sucked in, filtered and collected. Since all the air including dust sucked in is subjected to filtration, fine dust passes through the filter as well as through the air suction machine, thus accelerating the wear of the machine parts. Since the object is to collect only relatively large particles or pieces of debris such as fallen leaves, the mesh openings of the filter are made large, such that large amounts of dust are absorbed through the air suction machine, causing malfunction of the machine. In addition, since bag like filters of simple construction are used, a cover covering the filter is required, which causes the construction to be complicated.

SUMMARY OF THE INVENTION

The present invention discloses a debris collecting device and an associated method which does not impair operation by absorbing dust into the air suction machine, is simple in construction and easily separates and collects debris by providing a debris intake conduit for lifting the debris on the ground surface by the negative pressure of an air stream fed under pressure through an air stream passage connected to an air blower conduit. The debris intake conduit is joined or connected to the air stream passage such that air in the debris intake passage is entrained by the pressurized air stream in the air stream passage.

BRIEF DESCRIPTION OF THE DRAWINGS

FIG. 9 is a transverse elevational section of a powder dispensing attachment for mounting to an air blower conduit.

FIG. 10 is a section taken along line 10—10 in FIG. 9.

FIG. 11 is a section in elevation of a liquid dispensing attachment for mounting to an air blower conduit.

FIG. 12 is an alternate embodiment of the debris collecting device provided with a debris collecting container remote from the air blower unit.

DETAILED DESCRIPTION OF THE PREFERRED EMBODIMENT

The present invention relates to a debris collecting device for collecting debris such as fallen leaves on the ground surface.

Previously, debris collecting devices of this type have been constructed in such a manner that in response to suction generated by an air blowing machine, that debris such as fallen leaves on the ground surface are sucked in, filtered from the air stream and collected. The air filtered by the debris filter passes through the air suction machine, and fine dust passes through the filter without being retained and is absorbed by the air suction machine, such that the machine parts are worn rapidly by contamination with the dust. Since it is intended that only relatively large debris such as fallen leaves be collected, the mesh openings of the filter are made large, and large amounts of finer dust is absorbed by the air suction machine, detrimentally affecting operation of the air suction unit. In addition, since-bag like filters of simple construction are used, a case covering the filter is required, which causes the construction to be complicated.

Figure 1:
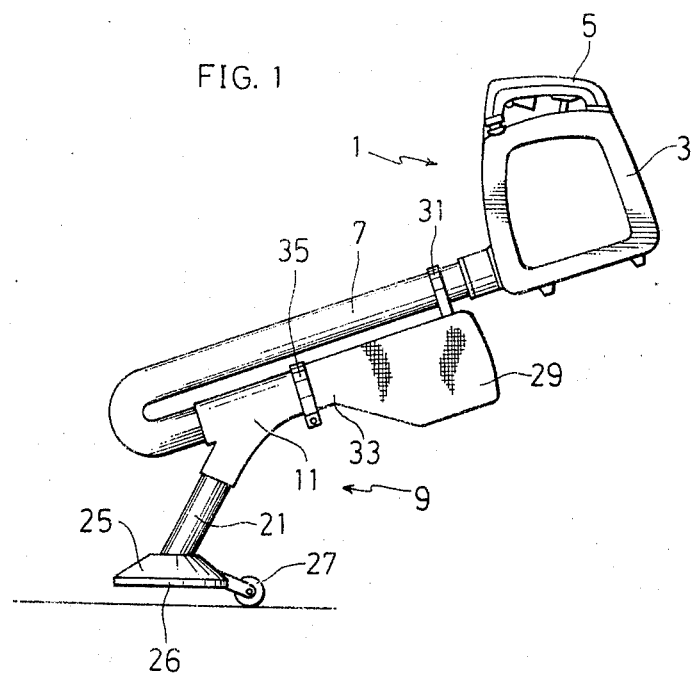
FIG. 1 shows in side elevation a debris collecting device embodying the present invention.
Figure 2:
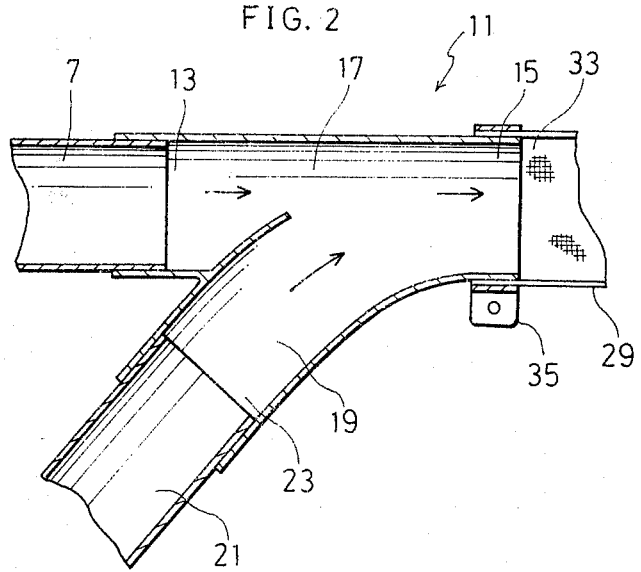
FIG. 2 is a fragmentary cross section showing a first embodiment of a basic construction of the present invention.

The present invention discloses a debris collecting device and associated method which absorbs dust through the air suction machine without hindering the operation thereof, is simple in construction and easily separates and collects debris by providing a debris intake passage for sucking in the debris on the ground surface under a negative air pressure generated by an air stream fed under pressure through an air stream passage connected to a debris intake passage. A first embodiment of the present invention will now be explained with reference to FIGS. 1 and 2.

Figure 6:
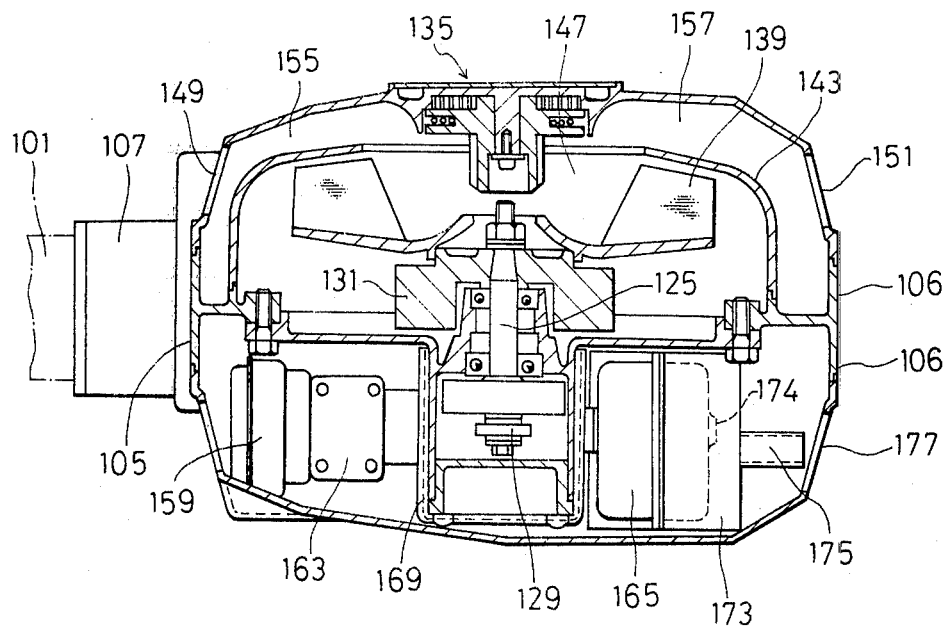
FIG. 6 is a side sectional view of one embodiment of a blower.

In the drawings, a portable air blower unit 1 includes an engine and air blower fan (one embodiment of which is shown in FIG. 6 described below.) mounted in a blower housing 3. The device also includes handle 5 is disposed on an upper portion of the engine housing 3, and a blower conduit 7 for blowing air under pressure. A debris collecting container 9 is removably mounted to the end of the conduit 7 and is constructed as described below. A suction Y joint is fitted into the end of the blower conduit 7 and includes a debris intake passage 19 connected at a slant with the air passage 17 between an inlet port 13 and an outlet port 15, the intake passage slanting toward the outlet port 15. The debris intake passage 19 communicates with the outlet port having the same internal diameter. A debris intake conduit 21 is fitted into a suction port 23 at the lower end of the debris intake conduit 19, and a frusto-conical shaped debris collecting hood member 25 is affixed in communication with conduit 21. The hood 25 has an open base 26 and a guide wheel 27 is rotatably mounted to a rear portion of the debris intake hood 25. A debris collecting bag 29 is suspended by means of retaining fittings 31 to the downstream end of the pressurized air duct 7. The open end 33 of the debris collecting bag 29 is fitted about the outer periphery of the outlet port 15 of the Y joint 11 and is secured by the retaining fittings 35.

In carrying out the debris collecting operation with the device described above, an operator holds the blower handle 5 with one hand, and the blower conduit 7 with the other hand, rests the guide wheel 27 on the ground surface, maintains a suitable spacing between the bottom of the dust collecting hood member 25 and the ground surface, and moves forward. The air stream which is generated by the blower fan incorporated in the blower housing 3 passes through the air passage 17 from the inlet port 13 of the Y joint 11 at high speed, enters the dust collecting bag 29 through the outlet port 15, passes through the cloth mesh of the bag 29 and is discharged into the atmosphere. When the air stream flows through the passage 17 at high speed, the air in the debris intake passage 19 is entrained by the air stream to generate a negative air pressure, so that the air is sucked in through the open bottom 26 of the intake hood member 25. In response to the air suction debris is lifted, passes through debris intake conduit 21 and through the debris intake arm 19 of the joint 11 and joins the air stream in the passage 17 from which it enters the dust collecting bag 29 where the debris is separated from the air flow and collected.

As is apparent from the above description, the present invention has the following advantages since this is a debris collecting device characterized by having a debris intake passage for lifting the debris from the ground surface by negative air pressure generated by an air stream fed under pressure through a Y joint. That is, (1) Since air pressure is employed, a portable air blower may be used; thus conventional blowing and gathering operations of fallen leaves and the like, i.e. by blowing to gather into a pile, and debris collecting by suction into a bag can be carried out interchangeably with the same air blower unit. (2) Since pressurized air is employed, the diameter of the air blower conduit and the like can be made smaller and compact. (3) The mesh aperture of the filter is not required to be made small in order to stop finer dust harmful to the blower, thus the load on the blower engine is reduced and overheating is avoided. (4) Harmful dust is not sucked into the air blower and operation of the device is not impaired thereby. (5) The separation and the collection of dust can be easily done and the case for accommodating the dust collecting bag is not required.

Figure 3:
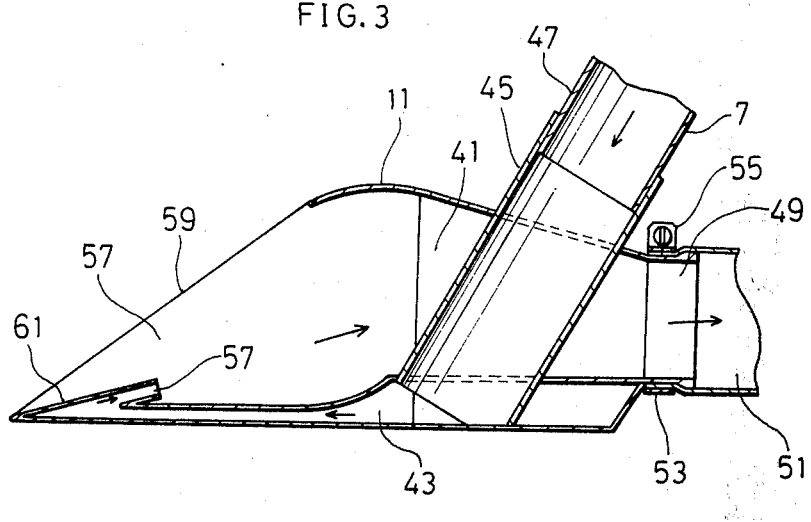
FIG. 3 is a fragmentary cross section showing a second embodiment of the invention.

Next, another embodiment of the invention, shown in FIG. 3 will be explained. This alternate embodiment provides an air stream passage for blowing air under pressure and a debris intake passage for guiding the debris collecting from the ground surface into an air stream flowing through the air stream passage connected therewith so as to inject at least part of this air stream in the direction of the debris intake passage. A blower conduit 7 carries a pressurized air stream generated by an air blower fan. A suction joint head 11 has an internal chamber which is partitioned horizontally and divided into an upper chamber 41 and a lower chamber 43. An air inlet 45 connects the air stream conduit 7 with the lower chamber 43. The upper end portion of the conduit 45 is removably fitted to the slightly conical end of the blower conduit 7. An air exhaust port 49 opens at a rear portion of the upper chamber 41 and the open end 53 of a dust collecting bag 51 is removably fitted and fixed thereto by means of clamp fittings 55. An air injection nozzle 57 is directed toward the rear of the upper chamber 41 from the front end of the lower chamber 43. Thus, an air stream conduit is formed which includes blower conduit 47, the inlet 45, a lower chamber 43, a nozzle 57, an upper chamber 41, and an exhaust port 49 opening into the debris collecting bag 51. A debris intake opening 57 communicates with the above mentioned air stream conduit in the upper chamber 41 from an opening 59 in the forward end of the upper chamber 41. A slanting plate like scraper 61 is provided at the lower portion of the opening end 59.

Figure 4:
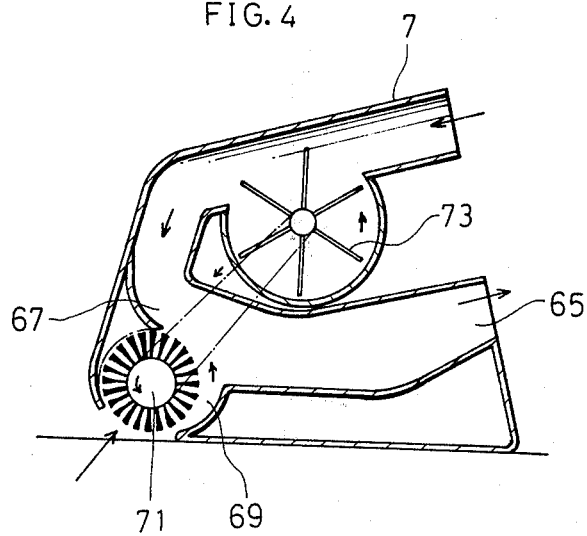
FIG. 4 is yet another embodiment provided with a scraper.

FIG. 4 shows a second alternate embodiment in which an air injection port 67 is provided in an upper portion of a debris intake passage 69, through which an air stream under pressure is injected. A brush like scraper 71 provided at the injection port 67 is rotated by a rotating paddle wheel 73 which is driven by the air stream.

Figure 5:
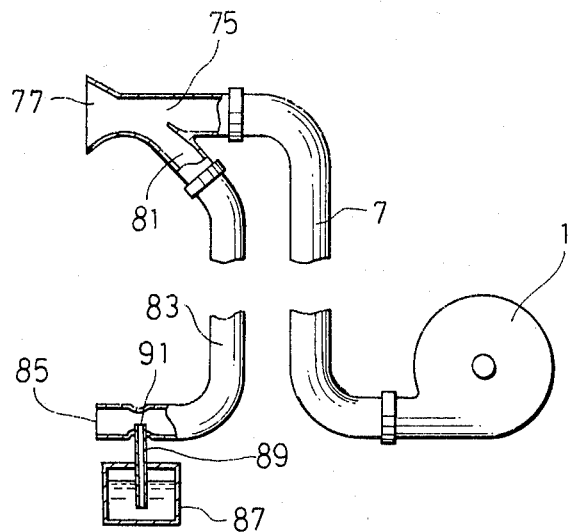
FIG. 5 shows an alternate embodiment which feeds chemicals from a chemicals tank to an air nozzle driven by a rotating blade which generates a pressurized air stream.

In FIG. 5 a flexible blower conduit 7 is provided for guiding the air stream of the blower 3. An air stream passage 75 is provided at the end of the blower conduit 7 and communicates the blower conduit 7 with a port 77. An air suction passage 81 joins the air stream passage 75 angling toward the direction of air flow. A suction pipe 83 communicates with the air suction passage 81 and has at the other end an air suction port 85, and is also provided with an injection port 91 and tube 89 communicating with a chemical tank.

The effect obtained in the just described embodiment can also be obtained in the earlier described preferred embodiment.

A cylindrical discharge port member divided by a division line of an axial direction line and an outer cylindrical cylinder fitted into the outer periphery of said discharge port member are disposed and an internal diameter portion of said discharge port member is disposed in such a manner that a rigid air blower conduit made of rigid material is fittably shaped, and an outer peripheral portion of said outer cylinder may be disposed in a shape of a fittable flexible air blower conduit made of flexible material.

Also, an air flow passage for blowing air under pressure to the debris collecting container from the blower is joined to said air flow passage, a debris intake passage for guiding the debris from the ground surface to said air flow passage and the debris collecting container may be removably mounted to the blower machine along the suction assembly 9.

FIG. 6 illustrates a portable engine driven blower unit in which a blower conduit 101 is fitted into a discharge port 107 which is fixed to a front face 105 of a blower housing 135, and has a nozzle provided at an opposite end. The blower unit also includes a connecting rod 129, a fly wheel 131 fixed to the other end of a shaft 125, a recoil starter 135, a fan 139 fixed to the fly wheel 131 by means of a bolt 141. A fan compartment 143 encloses the fan 139 and communicates through an air passage 145 with a discharge port 107 disposed at the front face ortion 105 of the fan compartment. An intake manifold 147 is disposed at the center of the fan compartment 143. Air intake suction portions 149, 151 are formed in the front face 105 of the case and in the rear face 106 respectively of the blower housing 135 and communicate with the intake manifold 147, through air intake passage 155, 157, respectively. An air cleaner 159 is fixed to the carburetor 163 of the engine and a muffler 165 communicates with the air exhaust port of the engine. 169 is a cylinder cover. A muffler cover 173 covers a muffler 165 and guides the air stream discharged from the air exhaust port 171, and mixes it with the exhaust air discharged from the discharge port 174 of the muffler 165. An exhaust port 177 opens to the rear face 153 of the blower housing 103, and is constructed in such a manner that the exhaust air exhausted from the exhaust tube 175 passes through the exhaust port 177 and is discharged rearward.

In the above mentioned construction, the operator, as mentioned before, holds the handle and the blower conduit. Air blown by the engine driven fan 139 is injected into the blower nozzle, to carry out cleaning operations by blowing and gathering fallen leaves and the like on the ground surface. The air sucked in by the fan is sucked in from the air intake ports 149, 151 which are provided on the front surface 105 and on the rear surface 106 respectively, and passes through the air intake passages 155, 157 and enters the intake manifold 147. The exhaust air of the engine enters from the air exhaust hole 167 to the muffler 165 and from the discharge port 174, into the air exhaust tube 175, through the exhaust port 177, and is dischargeed rearward.

It is understood that the air intake port may be disposed on the upper surface portion of the blower housing. Thus, at least on one of the front face portion, rear face portion, or upper face portion an air intake port is provided as well as an exhaust port opening toward the rear face portion. Thus, even when the operator stands either to the left or right sides of the portable air blower, clothes of the operator are not caught in the air intake port and hot air from the exhaust port is not blown at the operator.

The blower conduit communicating with the discharge port of the blower is fixed to the front portion of the blower housing. One of the air intake ports communicating with the intake manifold of the blower and the exhaust port for exhausting the air exhaust of the engine open on one face of the blower housing. The other air intake port may be opened and disposed on at least one of the front face, the rear face and the upper face of the blower housing.

In another embodiment, on an outer periphery of the cylinder, the cylinder cover for guiding the air flow of the fan is disposed, an air passage for receiving the air flow guided to said cylinder cover and guiding it to the outer atmosphere and the exhaust port of the muffler may be opened in said air flow passage.

The blower housing may be formed by dividing it into a main blower housing body and a cover portion disposed on a side portion, a lower end portion of said cover portion is engaged removably to the main blower housing body. On either one of the upper end portion of the cover portion and the main blower housing body an engaging piece may be provided, while an engaging jaw detachably engageable with the engaging jaw may be disposed as well as a press piece for disengaging said engaging jaw may be disposed.

Figure 7:
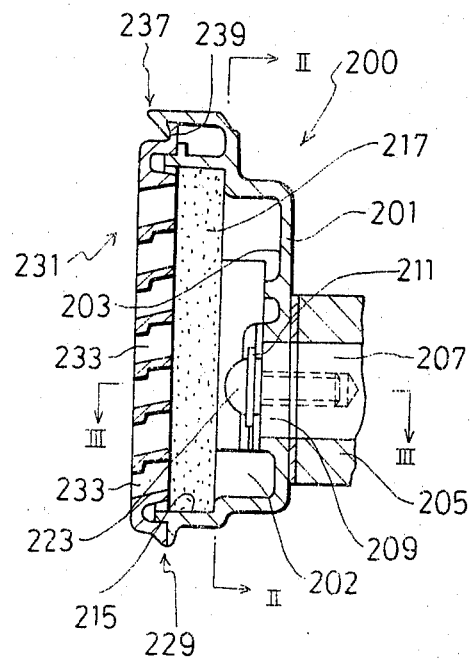
FIG. 7 is a cross section of an air cleaner filter holder for mounting to the housing of the air blower unit.
Figure 8:
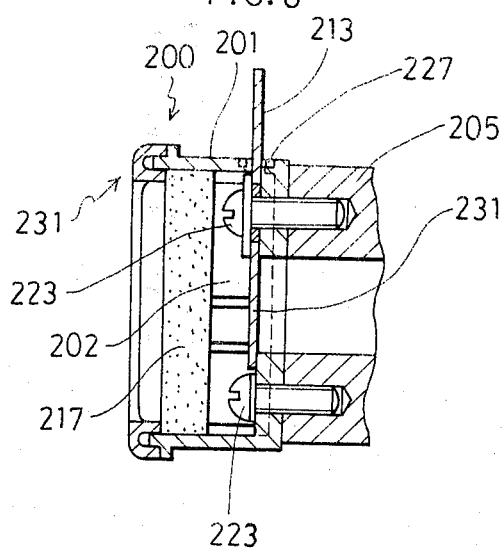
FIG. 8 is a section taken along line III—III in FIG. 7.

The air cleaner shown in FIGS. 7 and 8 includes a main cleaner body 201 having a bottom portion 203 and an open chamber 202. A port 209 communicates the internal chamber 202 with a carburator air intake 207 of the carburator 205. A dust filter 217 made of porous synthetic resin or the like is fitted to the opening 213 of the chamber 202. A bottom portion of the main body 201 is mounted to the carburator 205 by means of bolts 223. The actuating arm 213 of a shutter for opening and closing the port 209 is pivotably retained by the outer periphery of a washer mounted onto a bolt 223. An operating wire is connected to an outer end of the opening and closing arm 213. A slot is formed in a side wall of the air cleaner body, and along both slot edges, a seal plate is disposed and is shaped to protrude outward. The actuating arm 213 is disposed so as to movably extend through the seal plate. A cover portion 231 perforated with vent holes 233 is retained to the main body 201 by means of a folding hinge 229. On an upper portion of said main body 201, an interlocking portion 237 is provided and is detachably engageable with the retaining flange 239 extending from the cover 231. The main air cleaner body and the cover 231 are formed integrally with flexible material such as a soft synthetic resin.

The air drawn in through the vent holes 233 passes through the filter 217 to remove dust in the air, then passes through the communicating port 209, the air intake port 207, and is fed to the carburator 205. In order to exchange the filter 217, the retaining portion 237 of the cleaner body 201 is disengaged from the flange 239 of the cover 231 to open the cover 231, the contaminated filter 217 is taken out, and a new filter is inserted into the opening. Thus the dust filter of the present air cleaner can be easily replaced and the body of the air cleaner can be easily mounted. Furthermore, the number of parts is reduced, the cost is low, and the manufacture is easy.

What is claimed is:

1. In a debris collecting device of the type having a portable air blower unit, a blower conduit connected for directing the air stream from said blower to an air stream passage, and a debris intake conduit connected to said air stream passage such that air in said debris intake is entrained by said air stream in said air stream conduit whereby debris may be lifted from a ground surface into said intake conduit, said air stream passage having an exhaust end to which may be removably attached a debris collecting container, the improvement comprising an injection port for connection with a source of chemicals, said port opening into said debris intake conduit for injecting chemicals into said air stream, such that said debris collecting device may be converted to a chemical applicator upon removal of said collecting container.

* * * * *